United States Patent
Satzke

(10) Patent No.: US 7,173,767 B2
(45) Date of Patent: Feb. 6, 2007

(54) FOCUSING DEVICE

(75) Inventor: Klaus Satzke, Tamm (DE)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/536,672

(22) PCT Filed: Nov. 27, 2003

(86) PCT No.: PCT/IB03/06353
§ 371 (c)(1),
(2), (4) Date: Feb. 21, 2006

(87) PCT Pub. No.: WO2004/049019
PCT Pub. Date: Jun. 10, 2004

(65) Prior Publication Data
US 2006/0139763 A1    Jun. 29, 2006

(30) Foreign Application Priority Data
Nov. 28, 2002  (EP)  .................. 02360330

(51) Int. Cl.
*G02B 9/00*  (2006.01)
*G02B 6/02*  (2006.01)

(52) U.S. Cl. ................. 359/652; 359/654; 385/123

(58) Field of Classification Search ........ 359/652–654; 385/122–128
See application file for complete search history.

(56) References Cited

U.S. PATENT DOCUMENTS

| | | | |
|---|---|---|---|
| 3,650,598 A | 3/1972 | Kitano et al. | 385/124 |
| 4,403,825 A | 9/1983 | Tangonan et al. | 385/14 |
| 5,808,806 A | 9/1998 | Guhman et al. | 359/654 |
| 5,973,316 A | 10/1999 | Ebbesen et al. | 250/216 |
| 6,594,429 B1 * | 7/2003 | White | 385/124 |
| 6,990,282 B2 * | 1/2006 | Russell et al. | 385/125 |

OTHER PUBLICATIONS

PCT Search Report, Application No. PCT/IB03/06353, dated Apr. 16, 2004.

* cited by examiner

*Primary Examiner*—Scott J. Sugarman
*Assistant Examiner*—M. Hasan
(74) *Attorney, Agent, or Firm*—Patterson & Sheridan, LLP

(57) ABSTRACT

A focusing device with a refractive index profile changing from the center of the focusing device towards its perimeter, is made of a material wherein the lateral refractive index distribution of the focusing device material is homogeneous and wherein the focusing device comprises holes for introducing a graded refractive index profile. This allows accurate control of the graded refractive index profile.

18 Claims, 2 Drawing Sheets

FOCUSING DEVICE

BACKGROUND OF THE INVENTION

The invention relates to a Luneberg lens having a refractive index profile changing from the center of the lens towards its perimeter.

Integrated optics is an attractive approach for providing new devices for signal processing such as scanners, deflectors, modulators, switches, RF spectrum analyzers, multiplexers and demultiplexers because of the potential for very high performance operation and high speed processing using optical processing principles in structures which can be very small and rigid in planar configuration, and which can be manufactured by batch fabrication techniques. Such devices need thin-film waveguide lenses to control the shape of the guided beam for imaging, spatial filtering, focusing and Fourier analysis. The lenses for these applications must have high efficiencies, high performance and high stability. Further, lens accuracy, i.e. the focal length of the lens shape being accurate enough to satisfy design specifications, is essential for more precise applications such as where a well-collimated guided beam or sufficiently small beam spot size is needed.

A conventional lens for optical imaging of electromagnetic waves is based on a physical structure (concave or convex lens etc.) in which the dielectric constant encountered by a light wave changes abruptly at the air/lens interface. Focusing and other effects are based on the angle of incidence of the light wave and the contour of the lens surface. Special care must be taken to avoid effects such as back-reflection of diffraction or aberrations (e.g. due to off-axis effects).

Focusing can also be established by refraction of light based on a gradually changing index of refraction within an otherwise uniform material. In this case there is no abrupt change between two materials but rather a gradient in the index structures.

Graded-index (GRIN) lenses are useful for optical communications and in imaging systems because they do not rely on shape for their optical properties. A completely flat piece of radial-GRIN material can act as a lens. There is no abrupt physical interface between two materials with different indices of refraction but rather a gradient in the index of refraction. For example, an optical fiber is based on core and cladding materials with different indices of refraction. Although the transition between core and cladding can be abrupt, a smoothly varying transition provides a variety of advantages. In this case, the index gradient is radial, normal to the direction of the fiber. More commonly seen are rod structured GRIN-lenses in which an index gradient establishes the refractive properties of the lens. These can be reduced to small size and readily abutted against a fiber or other optical interfaces. Since they can be manufactured with precise optical and physical structures, GRIN lenses are widely used in miniaturized optical and optoelectronic systems.

Despite the usefulness of the devices, there are relatively few practical ways of manufacturing. Plastic fibers, which have been irradiated to change their optical properties radially, tend to be of low optical quality. Sol-gel processes do not allow large refractive index variations. The chemical-vapor-deposition (CVD) method, in which a hollow glass tube is filled with a glass-producing vapor that varies over time, works well but is expensive. The most mature manufacturing method today employs ion-exchange techniques, which involve ions diffusing into the surface of a glass rod.

Conventional lenses as well as GRIN Rod lenses suffer from back-reflection due to the index mismatch between lens material and the ambient material (i.e. air). Due to the index profile incorporated into Luneberg lenses they provide index matching to their environment and thus do not suffer from such reflection losses.

A Luneberg lens is a spherical lens without a specific direction serving as an optical axis. Each incident beam is directed towards the center of the sphere and is incident along an optical axis. Therefore, the Luneberg lens has performance advantages, specifically related to the aberrations due to off-axis effects in conventional lenses.

Luneberg lenses can be produced at low cost because an appropriately made fabrication mask is repeatedly useable. In addition, fabrication is easy because it involves a conventional deposition apparatus, and the thickness of the film is highly controllable. It is very important to control the lens shape since the lens characteristics are very sensitive to the film thickness and index distribution. Finally, diffraction-limited lenses with accurately predictable focal length can be routinely made. Still, for some applications the control of the non-homogeneous refractive index in the lens material obtainable by p.ex. diffusion is not accurate enough.

U.S. Pat. No. 4,403,825 discloses a method for lens formation employing illumination of a photosensitive film through an aperture with adjustable size to produce the required effective index profile. However, this method does not allow sufficient control of the index profile within the photosensitive layer. In particular, a chalcogenide glass layer is suggested as photosensitive layer. This has the disadvantage that its optical characteristics are not stable due to the adverse effects of light and/or moisture. Furthermore, some applications require much more accurate focal length and focal spot sizes as is possible with the lenses according to the state of the art.

OBJECT OF THE INVENTION

It is the object of the invention to suggest a focusing device which is compatible with standard silica waveguide technology and which has a well controlled refractive index profile.

SUMMARY OF THE INVENTION

This object is achieved by a focusing device with a refractive index profile changing from the center of the lens towards its perimeter, wherein the lateral refractive index distribution of the lens material is homogenous, and wherein the lens comprises holes for introducing a graded refractive index profile. In contrast to prior art the focusing device according to the invention uses a material with uniform lateral refractive index distribution. The variation of the refractive index is introduced by a subsequent patterning step employing technologies such as lithography and reactive ion edging. The holes are arranged perpendicular to the incident beam of light. In most optical materials the atomic or molecular structure is so fine that the propagation of light within them may be characterized by their refractive indices. When an object has a structure which is larger than the wavelength of light its influence on the propagation of light may be described by the laws of diffraction, refraction and reflection. Between these two extremes there is a region where the structure is too fine to give rise to diffraction but is too coarse for the medium to be considered as homogenous. Sub-wavelength structures can be formed by microlithography. If the scale of the structure is substantially smaller than the wavelength of light it will not be resolved by the light and the light "sees" a composite material, the optical properties of which are between those of air and those of the base material. Thus, in particular if the spacing between the holes and the diameter of the holes is chosen in the sub-wavelength region, i.e. in the order of several hundred nanometers, a perfect control of the profile of the refractive index of the focusing device and a perfect matching of the refractive index to the environmental material can be achieved. Such accurate control of the profile of the refractive index is not possible with other techniques such as diffusion or complex polymerization of the focusing device layer. Generally, the holes may be of any shape, however, preferably they have a round or square cross-section. Also, the holes may have the same size or vary in size. Advantageously, the focusing device is a Luneberg lens.

In a preferred embodiment of the invention the density of holes increases towards the periphery of the focusing device. Towards the periphery of the proposed focusing device the whole density is increased, so that index matching between the lens and the environment, e.g. air, is obtained. At the perimeter of the focusing device the structure is completely removed, which is equivalent to a hole density of 100%.

The holes can be distributed at random, in particular according to a generalized Monte Carlo algorithm. The variation of the hole density can thus be chosen such that the density of the remaining material corresponds to the desired graded refractive index variation of the focusing device.

In a special case of practical interest with a far-field source and the focus lying on the surface of a sphere of unit radius, the required radial dependence of the index profile n(r) is given by:

$$n^2(r)=(2-(r/R)^2)$$

In a more general case in which the environment has a refractive index $n_{env}$ greater than unity, the index profile is defined by $$n^2(r)=n_{env}(2-(r/R)^2),$$

where R is the radius of the focusing device.

In an advantageous embodiment of the invention the focusing device comprises at least two layers deposited on a substrate. For example, a buffer layer is deposited on top of a silicon wafer. This is followed by a core and a cladding layer where the cladding layer can also be air. The refractive index of the core layer material is slightly larger than that of the buffer and the cladding layer material in order to provide confinement of the optical field in the core layer. Advantageously, the layer structure consisting of buffer layer, core layer, and cladding layer is fabricated using Boro-Phospho-Silicate glass (PBSG). The layer stack can be deposited, for example, by chemical vapor deposition (CVD) or flame hydrolysis deposition (FHD). Another possibility for the realization employs spin-coating a sequence of transparent polymer layers (e.g. polyimide) on top of a silicon wafer, with each layer having a different refractive index, thus defining a waveguide structure.

The refractive index in the center of the focusing device is given by the effective mode index of the layer structure. As the density of holes provided perpendicular to the layer structure increases, the refractive index of the layer structure changes in lateral direction. It is obvious from the above description that according to this embodiment of the invention the focusing device is planar which allows its integration into optical circuits.

Within the scope of the invention falls a device, such as a scanner, deflector, modulator, switch, spectrum analyzer and optical communications system, which incorporates a focusing device described above.

The object is also solved by a method of fabricating a planar focusing device wherein a pattern of holes arranged at random in a circular area is defined by nano-imprint or lithography, in particular by electron beam lithograph, on a layer structure and that the holes thus defined are etched in particular by reactive ion etching. By this method random nanostructures for broad band operation in the 1400 to 1650 nm wavelength range is possible. The focusing device produced according to the inventive method allows accurate control over the change of the refractive index of the focusing device material from the center of the focusing device to the perimeter of the focusing device such that exact matching of the refractive index at the perimeter of the focusing device with the refractive index of the surrounding material is obtained. The production of such devices according to the inventive method is low cost due to batch fabrication and well controllable since the individual processing steps are standard procedures.

In a variant of the inventive method the holes are distributed according to a generalized Monte Carlo algorithm. In order to form the pattern of holes in the focusing device a mask needs to be designed. Within an aperture corresponding to the shape of the focusing device a large number of holes must be distributed. The distribution of holes is particularly easy, if a generalized Monte Carlo Algorithm is used for automatic distribution of the holes.

Preferably the holes are etched down to the substrate, in particular a silicon wafer. Thus, the holes are provided in all layers of the focusing device, in particular a buffer-, core- and cladding layer.

In a further variant of the inventive method the holes are patterned with a distance between holes and diameters of the holes in the sub-wavelength regime. The term diameter is not to be understood as limiting the invention to round holes. Any cross-sectional shape can be used for the holes. Diameter thus refers to the size of the cross-section of a hole. The distance between holes and the size of the holes is chosen according to the required distribution of the refractive index of the focusing device, which depends on the application of the focusing device. If the distance between holes and the size of the holes is chosen in the sub-wavelength regime i.e. if the scale of the structure is substantially smaller than the wavelength of light, the structure is not resolved by the light and the light behaves as if the focusing device were a composite material having optical properties between those of the surrounding material and those of the layer material.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION

Figure 1:
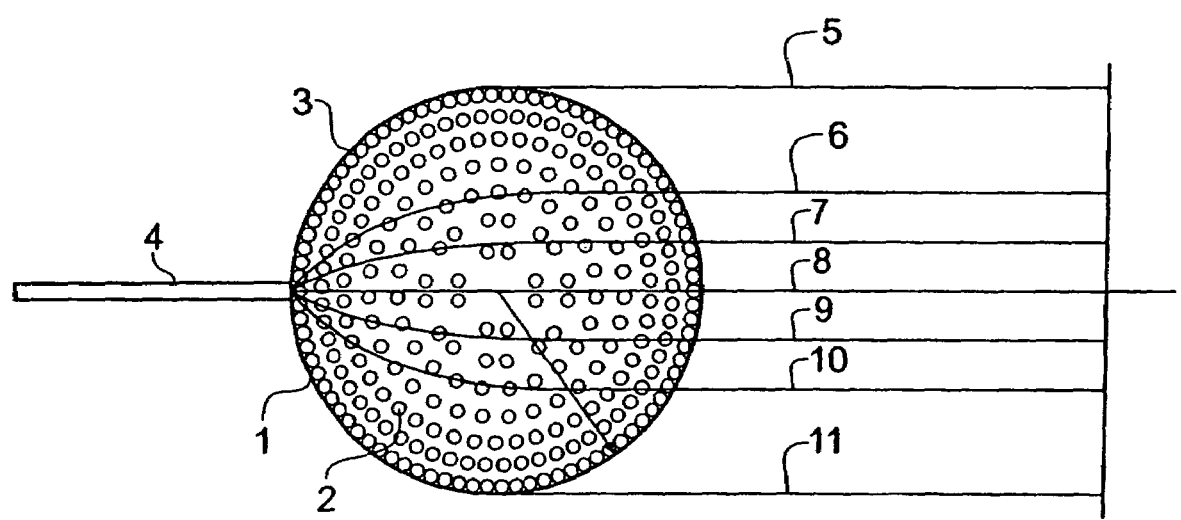
FIG. 1 shows a plan view of a focusing device and waveguide.

The focusing device 1 shown in FIG. 1 has a circular shape and is embodied as a Luneberg lens. The focusing device 1 comprises holes 2, were the hole density increases from the center of the focusing device 1 towards the perimeter 3 of the focusing device 1. Adjacent to the focusing device 1 is provided a waveguide 4 into which light focused by the focusing device 1 is coupled. Lines 5–11 correspond to incident light beams of different wavelengths which are focused by the focusing device 1 towards the waveguide 4. Thus, in this direction the focusing device 1 acts as multiplexer. However, the focusing device 1 can also be operated in the opposite direction, meaning that a light beam coming from waveguide 4 and incident on the focusing device 1 is separated into light beams according to the wavelength of light.

Figure 2:
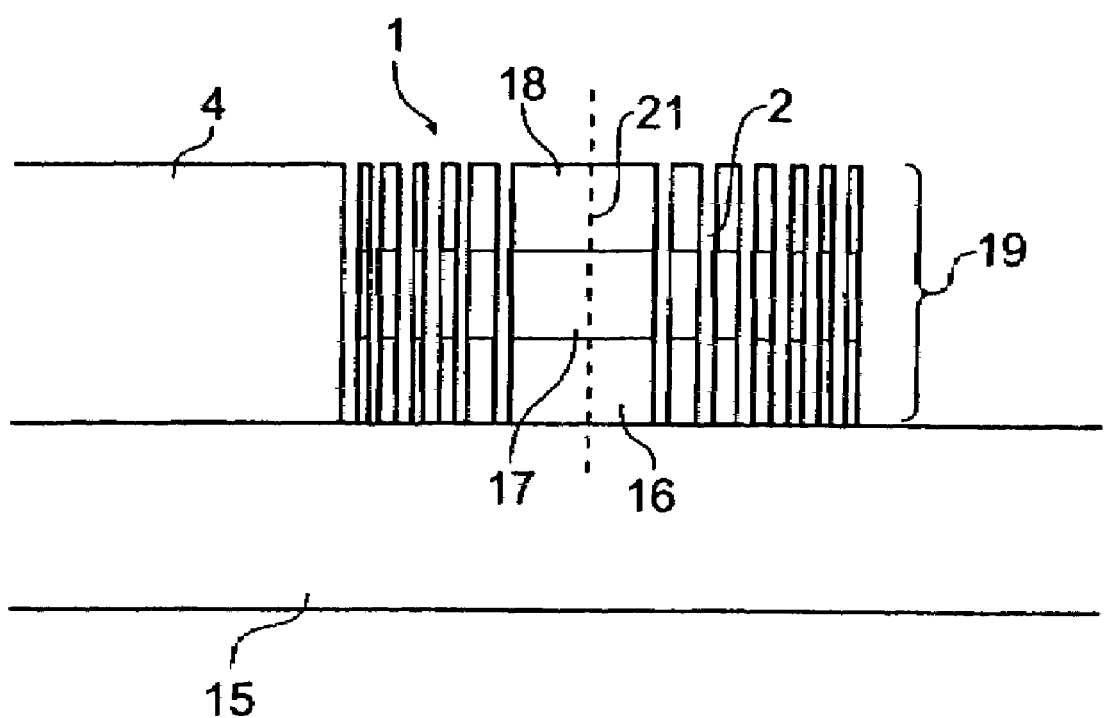
FIG. 2 shows a vertical cross-section through the focusing device of FIG. 1.

FIG. 2 shows the vertical structure of the focusing device 1 according to FIG. 1. On top of a silicon substrate 15 is provided a buffer layer 16. A core layer 17 is embedded between the buffer layer 16 and a cladding layer 18. In the preferred embodiment the layer stack 19 consisting of buffer layer 16, core layer 17, and cladding layer 18 are made of PBSG. The layers 16–18 each have a homogenous refractive index. Within the layer stack 19 are provided vertical holes 2, i.e. perpendicular to the layer stack 19, which influence the resulting refractive index of the layer stack 19. This implies that the refractive index changes with distance from the center 21 of the focusing device towards the perimeter 3 of the focusing device, where the refractive index at the perimeter 3 of the focusing device corresponds to that of the surrounding material. Light is coupled into the focusing device 1 via the waveguide 4.

Figure 3:
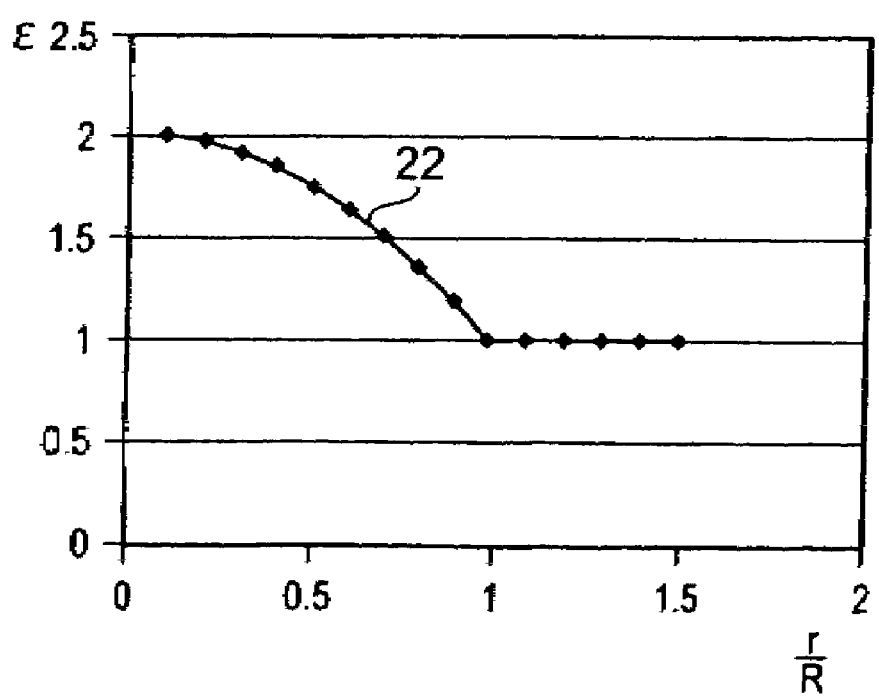
FIG. 3 shows a diagram of the dependence of the dielectric constant on the distance from the center of the focusing device of FIG. 1.

FIG. 3 shows a diagram of the dielectric constant $\epsilon(r)=n^2(r)$ for low-loss materials against the distance r/R, where R is the radius of the focusing device, from the center of the focusing device and n is the refractive index. The variation of the dielectric constant is shown by curve 22. At the center of the focusing device (r/R=0) the dielectric constant is 2 and decreases to 1 at the perimeter (r/R=1) of the focusing device. FIG. 3 shows the ideal variation of the dielectric constant corresponding to the ideal graded refractive index profile, following the equation 68 $(r)=n^2(r)=(2-(r/R)^2)$ within the focusing device, i.e. for r/R<1.

A focusing device 1 with a refractive index profile changing from the center of the focusing device 1 towards its perimeter 3, is made of a material wherein the lateral refractive index distribution of the focusing device material is homogeneous and wherein the focusing device 1 comprises holes 2 for introducing a graded refractive index profile. This allows accurate control of the graded refractive index profile.

The invention claimed is:

1. A focusing device with a refractive index profile changing from the center of the focusing device towards its perimeter, comprising:

a substrate;

a buffer layer and a core layer disposed on the substrate, wherein a lateral refractive index distribution of the focusing device material is homogeneous; and a plurality of holes formed in the layers such that the holes are substantially perpendicular to the substrate and the holes introduce a graded refractive index profile.

2. The focusing device according to claim 1, wherein the density of holes increases towards the periphery of the focusing device.

3. The focusing device according to claim 1, wherein the holes are distributed at random.

4. The focusing device according to claim 1, wherein the holes are distributed according to a Monte Carlo algorithm.

5. A device comprising a focusing device according to claim 1.

6. The focusing device according to claim 1, wherein the holes are arranged substantially perpendicular to an incident beam of light which enters the focusing device.

7. The focusing device according to claim 1, further comprising a clad layer disposed on the core layer.

8. The focusing device according to claim 1, wherein the focusing device is a lens.

9. The focusing device according to claim 8, wherein the lens is configured to be disposed adjacent a fiber.

10. A focusing device comprising:

a substrate;

a layer stack disposed on the substrate, the layer stack comprising a buffer layer and a core layer; and a plurality of holes formed in the layer stack, wherein the holes are arranged substantially perpendicular to an incident beam of light which enters the focusing device and the holes are configured to introduce a graded refractive index profile.

11. The focusing device according to claim 10, wherein the layer stack further comprises a clad layer disposed on the core layer.

12. The focusing device according to claim 10, wherein the holes are substantially perpendicular to the substrate.

13. The focusing device according to claim 10, wherein the holes are square shaped.

14. The focusing device according to claim 10, wherein the substrate has a circular shape.

15. The focusing device according to claim 10, wherein the focusing device is a lens.

16. The focusing device according to claim 10, wherein the density of holes increases towards the periphery of the focusing device.

17. The focusing device according to claim 10, wherein the holes are distributed at random.

18. The focusing device according to claim 10, wherein the holes are distributed according to a Monte Carlo algorithm.

* * * * *